(12) United States Patent
Santos Gómez (10) Patent No.: US 7,731,207 B2
(45) Date of Patent: Jun. 8, 2010

(54) MOBILE TRANSPORT PLATFORM FOR THE HANDLING OF AERONAUTICAL PARTS

(75) Inventor: José Manuel Santos Gómez, Madrid (ES)

(73) Assignee: Airbus Operations, S.L., Getafe, (Madrid) (ES)

( * ) Notice: Subject to any disclaimer, the term of this patent is extended or adjusted under 35 U.S.C. 154(b) by 149 days.

(21) Appl. No.: 11/716,605

(22) Filed: Mar. 12, 2007

(65) Prior Publication Data

US 2008/0073866 A1 Mar. 27, 2008

(30) Foreign Application Priority Data

Sep. 27, 2006 (ES) ................................ 200602456

(51) Int. Cl.
*B62B 3/02* (2006.01)
(52) U.S. Cl. ..................... 280/79.11; 280/408; 414/339
(58) Field of Classification Search ................ 280/79.2, 280/79.11, 408; 414/339, 501
See application file for complete search history.

(56) References Cited

U.S. PATENT DOCUMENTS

| | | | | |
|---|---|---|---|---|
| 3,279,631 A | * | 10/1966 | McCartney | 414/532 |
| 3,447,665 A | * | 6/1969 | Dioguardi et al. | 198/782 |
| 3,506,144 A | * | 4/1970 | Frassetto et al. | 414/343 |
| 3,598,263 A | * | 8/1971 | Ehmke | 414/620 |
| 3,604,576 A | * | 9/1971 | Poccard | 414/339 |
| 3,948,071 A | * | 4/1976 | Lieberman et al. | 72/20.1 |
| 4,029,164 A | * | 6/1977 | Urakami | 180/164 |
| 5,059,088 A | * | 10/1991 | Klein | 414/627 |
| 5,261,265 A | * | 11/1993 | Nichols | 72/420 |
| 5,910,183 A | | 6/1999 | Ford et al. | |
| 6,158,727 A | | 12/2000 | Fox | |
| 6,641,131 B2 | * | 11/2003 | Stohr et al. | 271/91 |
| 7,416,196 B2 | * | 8/2008 | Brown | 280/79.11 |

FOREIGN PATENT DOCUMENTS

| | | |
|---|---|---|
| CN | 2782674 | 5/2006 |
| JP | 10-225734 | 8/1998 |
| WO | 00/08905 | 2/2000 |

OTHER PUBLICATIONS

Spanish Search Report issued Jan. 18, 2008 (with English translation) in Spanish application 2 294 947, which is a counterpart to the present application.

* cited by examiner

*Primary Examiner*—Lesley Morris
*Assistant Examiner*—Bridget Avery
(74) *Attorney, Agent, or Firm*—Wenderoth, Lind & Ponack L.L.P.

(57) ABSTRACT

A mobile transport platform for the handling of aeronautical parts with a frame has an array of telescopic actuators vertically arranged in rows and columns, each telescopic actuator is coupled by one end to the frame, and has a coupled head (2c) at its opposite end; a control system connected to each telescopic actuator for individually controlling the actuation of each telescopic actuator so that the telescopic actuator can adapt a position between that of maximum extension in which the head and at least part of the shaft of the telescopic actuator project from the plane of the load surface, and that of maximum retraction in which at least the shaft of the telescopic actuator does not project from the plane of the load surface.

19 Claims, 7 Drawing Sheets

MOBILE TRANSPORT PLATFORM FOR THE HANDLING OF AERONAUTICAL PARTS

BACKGROUND OF THE INVENTION

I. Field of Invention

This invention relates to the field of manufacturing technologies for aeronautical parts and particularly the sector of transportation tools for transporting such parts between manufacturing stations.

II. Prior Art of the Invention

In the manufacture of aeronautical parts, the handling of each of the parts during its manufacturing stages is currently very varied and depends on the specific process of manufacture being used. Among such parts to be found are large size parts such as wings, stabilizers, fuselage panels, rudders, etc., and parts thereof, such as their coverings. In order to handle these parts and their transportation between the various manufacturing stations which they have to pass through, there exists a wide range of tools, trolleys, stocks, etc., for being able to handle the parts depending on the state or phase of manufacture that the parts are to be found in at any moment.

Nowadays, carbon fibre based materials are more and more prevalent than aluminium for aeronautical coverings. Such coverings are typically manufactured as follows.

First, the covering is taped to a tool generally made of Invar. The taping is a process consisting of locating layers of reinforced composite material in the form of strips on a mold in different directions in order to obtain the desired properties. An example of a composite material widely used in the aeronautical industry is preimpregnate, a mixture of fibrous reinforcement and a polymer matrix used for manufacturing composite materials in such a way that it can be stored for later use. In this process, the strips are not placed randomly; instead, they are generally laid or deposited in certain directions, specifically, at 0°, 90°, 45° and −45°. The number of layers (thickness) and the depositing of the strips in certain directions or others is determined according to the nature and magnitude of the stresses which the part is going to withstand at each point.

Following the taping, it is necessary to confer stiffness on the covering, for which a structure of horizontal and vertical stiffeners is used. In order to locate the stiffeners in the right directions in the coverings, certain modules with different geometries are used, arranged matrix-fashion, between which the horizontal and vertical stiffeners are introduced. Initially, the modules are located in a tipping frame and the stiffeners are introduced between them. Afterwards, the frame is rotated, and the entire array (stiffeners and modules) is located on the covering in the proper position; on this array a bag is located with which a vacuum will be created in order to prevent porosities and then the entire array (tool+covering+stiffeners+modules+vacuum bag) is then introduced into an oven, known as an autoclave, in order to provide the part with the desired characteristics. The autoclave is usually a horizontal cylindrical tank in which the parts are introduced, with a door at one of its ends and a fan plus the heating and cooling system at the opposite end. The autoclave is charged with compressed air plus nitrogen up to the required pressure, depending on the curing cycle of the parts, and the mixture (air+N2) is then recirculated inside by the fan in order to heat up the parts, the temperature being reached and maintained with the heating system (an array of resistors) or cooling by means of the cooling system. By this stage, it is possible to cure the parts.

Following the curing, it is necessary to withdraw the vacuum bag and the modules for the covering. The vacuum bag is withdrawn by hand. After that, the mold stripping or withdrawal of the modules located on the covering is carried out. The last two stages consist of edging and ultrasound inspection. Once the edging phase is completed, the part has to be transported to the automatic inspection machine where it is positioned and secured in the right position for carrying out non-destructive inspection of the part. By means of this stage, the intrinsic quality of the element is defined without damaging it, in other words, a definition is made of whether it has any problems regarding later use. For these tests, inspection equipment is used that is capable of detecting any discontinuities that might be present in the material being used (in this case, carbon fibre) and recording them without damaging the part.

As a final stage, if the entire manufacturing process has been passed through correctly (no manufacturing defect has been detected in the part), the part will be taken to the parts dispatch warehouse or, if any defect was detected in the inspection, the part will be taken to the repair zone so that the necessary operations can be carried out there for rectifying the part.

Each of these stages generally use different transport devices, involving not just the cost of purchasing and maintenance of these devices but also the fact that these devices are used sporadically and discontinuously, plus the fact that they generate handling times which increase the work and slow down the manufacturing process.

For that reason, it was desirable to overcome the drawbacks described above and achieve a handling of parts that would permit the manufacturing costs of the aeronautical parts to be reduced by saving handling times which do not add any value to the part. This was particularly desirable in view of the fact that the rate of manufacture of aeronautical parts, which did not usually very high in comparison with other sectors, has now increased notably and the forecast for the coming years is that it is going to increase even further.

SUMMARY OF THE INVENTION

The object of the present invention is to overcome or at least mitigate the drawbacks of the state of the art previously described by means of a mobile transport platform for the handling of aeronautical parts with a frame consisting of an upper load surface provided between a right lateral part, a left lateral part, a front part, a rear part and a lower part, transport wheels on which the frame rolls, the platform comprising an array of telescopic actuators vertically arranged in rows and columns, and selected from between pneumatic telescopic actuators and hydraulic telescopic actuators; a control system connected to each telescopic actuator for individually controlling the actuation of each telescopic actuator so that the telescopic actuator can adopt a position between that of maximum extension in which the head and at least part of the shaft of the telescopic actuator project from the plane of the load surface, and that of maximum retraction in which at least the shaft of the telescopic actuator does not project from the plane of the load surface, each of the telescopic actuators comprising an actuation cylinder anchored to the frame, a shaft coupled via one end to the actuation cylinder and with one end free, and a head coupled to the free end of the shaft.

By these actuators, support planes can be shaped which are adapted to the surface of the manufacturing part, in other words, the height of the heads of each of the telescopic cylinders can be adjusted such that all together the surfaces of those heads form a "bed" adapted to the shape of the surface of the part resting on those surfaces. Likewise, these actuators can be used for immobilizing the tools arranged on the elevated spaces.

In one embodiment of the platform of the present invention, the frame comprises individual longitudinal elevated spaces respectively arranged in the left part and the right part of the frame. These elevated spaces have upper surfaces which emerge above the plane of the upper surface of the frame. Freely rotating elements such as rollers, wheels and/or balls, able to rotate in at least the axial direction of the elevated spaces, and/or rolling rails on the upper surfaces of the elevated spaces can be housed on the surfaces. Various tools can be arranged on the elevated spaces in which the parts are located during the different stages of manufacture.

Preferably, the head of each telescopic actuator is coupled to the shaft by a swivel coupling, conventional in itself. In this way, the position of the head can be freely adapted to the curves and swellings of the surface of the part resting on the heads of the telescopic actuators. Likewise, the head of the telescopic actuator can consist of an upper part made of an elastically deformable material, also known in itself, such as for example a rubber type of elastomer, which prevents the head of the actuator from damaging the surface of the supported part.

In an especially preferred embodiment, the head of each telescopic actuator consists of a suction cup whose mouth is in contact with the part and which can consist of a ring made of an elastically deformable material. Each suction cup can be connected to a pneumatic system able to produce a vacuum in such a way that, when the vacuum is produced, the suction cups of the telescopic actuators remain stuck to the surface of the part by suction, which permits an efficient immobilization of the part on the heads of the telescopic actuators. The structures of those suction cups and pneumatic systems are known in themselves, and are used in, for example, tipping systems for sheets, plastic parts or cardboard.

The transport wheels for the platform can be freely rotating or propelled by an electric motor or combustion engine, conventional in themselves, and connected to brake systems which are also conventional.

The platform can likewise be provided with accessories permitting the necessary tools involved in the process to be deposited on top, easily and precisely, and to be immobilized in this position, as can the parts which have to be produced in each phase of the process which in most cases will be bulky.

In order to be able to guide the platform in its travel along the separate stations, its propulsion can be connected to a navigation system conventional in itself, such as for example a navigation system by radio frequency, GPS or by marks on the floor. These navigation systems are common in other sectors, for example in systems for managing the storage of a range of products or in container handling systems for transport. Likewise, the mobile platform can be fitted with volumetric sensors which avoid collisions of the platform itself with other objects and also prevent damage to the parts and tools, so that parts which have to be rejected due to poor handling can thus be reduced.

The platform forming the object of the present invention can be used, for example, in a manufacturing process for a covering part such as that described in the section on "Prior art of the invention", of this descriptive specification.

To achieve this, the platform is positioned under a gantry crane in order to place the tool on it that is going to carry out the taping. In order to ensure the correct position of the tool, the platform can be provided with some positioning buffers, conventional in themselves.

With the tool correctly positioned, the platform is displaced by manual control or with the aid of a navigation system or by sensors which recognize marks on the floor, towards the taping station.

Once the correct position has been reached in the taping station, at least some of the cylinders will be activated in order to immobilize the tool provided above the platform so that it does not become displaced from that position during taping.

Following taping, the platform with the tool carrying the part shaped by the taping will be manually or automatically displaced to the module tipping station in order to carry out the preparation of the part prior to introducing it into the autoclave.

From the tipping station, the platform will be displaced to the curing station where the tool with the taped part is positioned on the autoclave trolley and the assembly thus formed is introduced into the autoclave.

Once the curing is finished, the tool is withdrawn from the autoclave trolley and is again placed on the platform which will then be displaced to the mold stripping station where the cured part is extracted from the tool, and the tool is withdrawn from the platform. The stripped part is deposited on the telescopic actuators which, on orders from the electronic control system, will each have been adapted to the height necessary for shaping the support "bed" adapted to the shape of the surface.

The platform with the stripped part will then be displaced to the edging station where the suction cups of the telescopic actuators will act in order to immobilise the part during edging. When the edging phase is finished, the platform with the edged part which rests on the "bed" formed by the telescopic actuators will be displaced to the automatic inspection station for the appropriate non-destructive inspection of the part and, once the inspection is concluded, the platform with the inspected part will be displaced to the parts store or to the operations zone, depending on the result of the inspection.

It can be seen that the characteristics of the mobile platform mean that the part is not kept on hold awaiting a specific transport tool for that stage, or awaiting a person, etc., so that it can be taken to the next manufacturing station. In this way, the down times which appear during the course of the manufacture of the part manage to be avoided. Also, with the use of this mobile platform, the machines through which the part moves during the manufacturing process do not need to have their own tools for securing the part, implying an additional savings.

BRIEF DESCRIPTION OF THE FIGURES

Described below are certain practical aspects of embodiments of the invention on the basis of some drawings, in which.

DETAILED DESCRIPTION OF THE INVENTION

The embodiment of the mobile platform shown in FIGS. 1 to 8 includes of a frame 1 with an upper load surface 1a provided between a right lateral part 1b, a left lateral part 1c, a front part 1d, a rear part 1e and a lower part 1f, in addition to transport wheels 5 driven by electric propulsion motors 14. According to that shown in FIG. 3, the front parts 1d and rear parts 1e of the frame 1 are provided with separate volumetric sensors 15 conventional in themselves, intended to prevent collisions of the mobile platform during its travel around the various manufacturing stations.

The load surface 1a is demarcated between separate longitudinal elevated spaces 3, 4 the upper surfaces of which 3a, 4a emerge above the plane of the load surface 1a. Housed in the upper surfaces 3a, 4a of the elevated spaces 3, 4 are some freely rotating elements 3b, 4b in the form of balls arranged in housings that are conventional in themselves.

The load surface 1a is provided with rows and columns of spaces 1g in which are located the shafts 2b of respective telescopic actuators 2 whose actuation cylinders 2a are anchored in the lower part 1h of the frame 1. As can be seen from FIGS. 1 and 2, the upper parts of the spaces 1g have a complementary shape to that of the heads 2c of the actuators 2, in such a way that, in the position of maximum retraction of the actuators 2, the heads 2c thereof are virtually flush with the upper plane of the load surface 1a while in their position of maximum extension, shown in FIGS. 4 and 5, the shafts 2b of the actuators 2 emerge via the spaces 1g and their heads 2c project beyond the plane of the surfaces 3a, 4a of the elevated spaces 3, 4.

Figure 1:
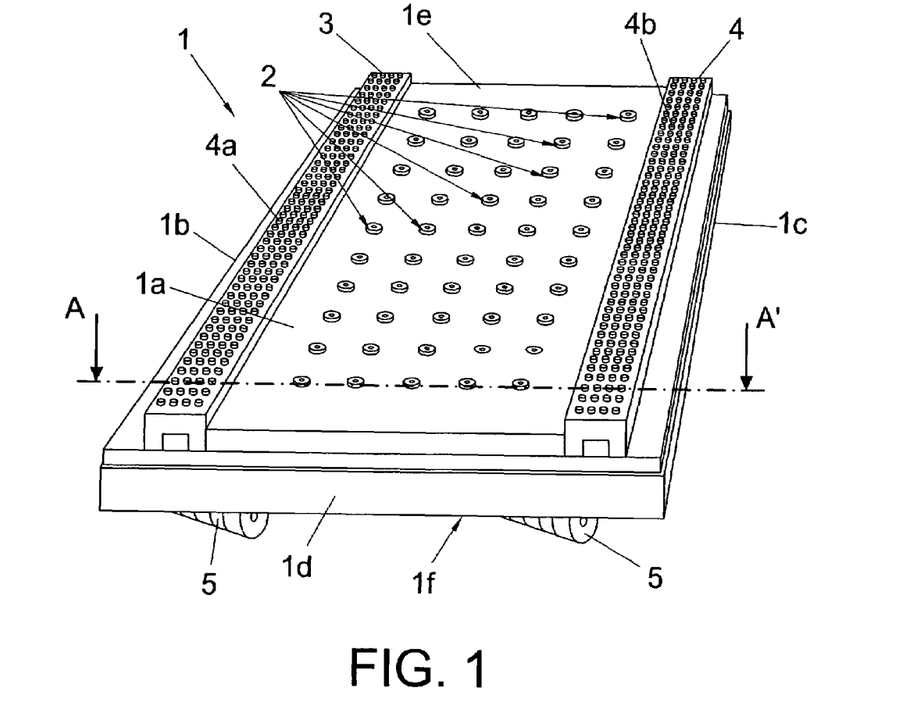
FIG. 1 is a schematic view in front perspective of an embodiment of a platform according to the present invention with telescopic actuators in the position of maximum retraction.
Figure 2:
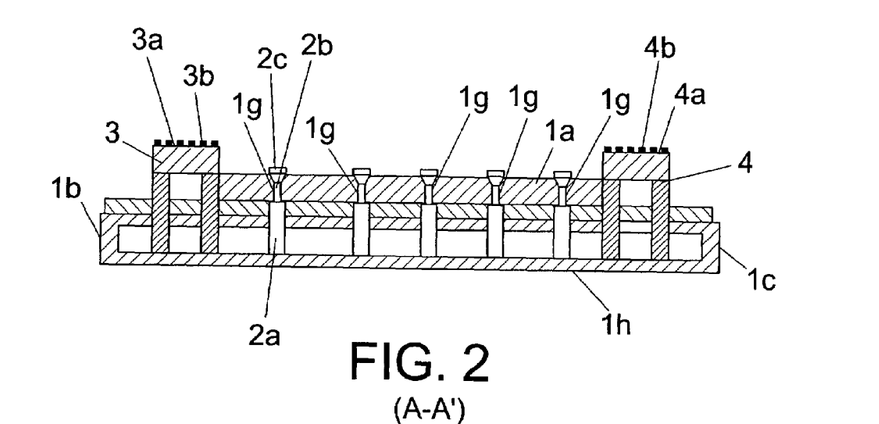
FIG. 2 is a schematic view in cross-section through the line A-A' appearing in FIG. 1.
Figure 3:
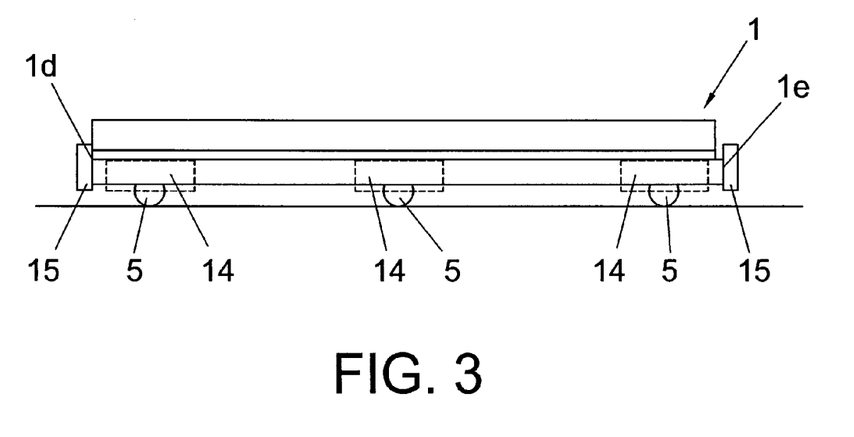
FIG. 3 is a schematic view in lateral elevation of the platform shown in FIG. 1.
Figure 4:
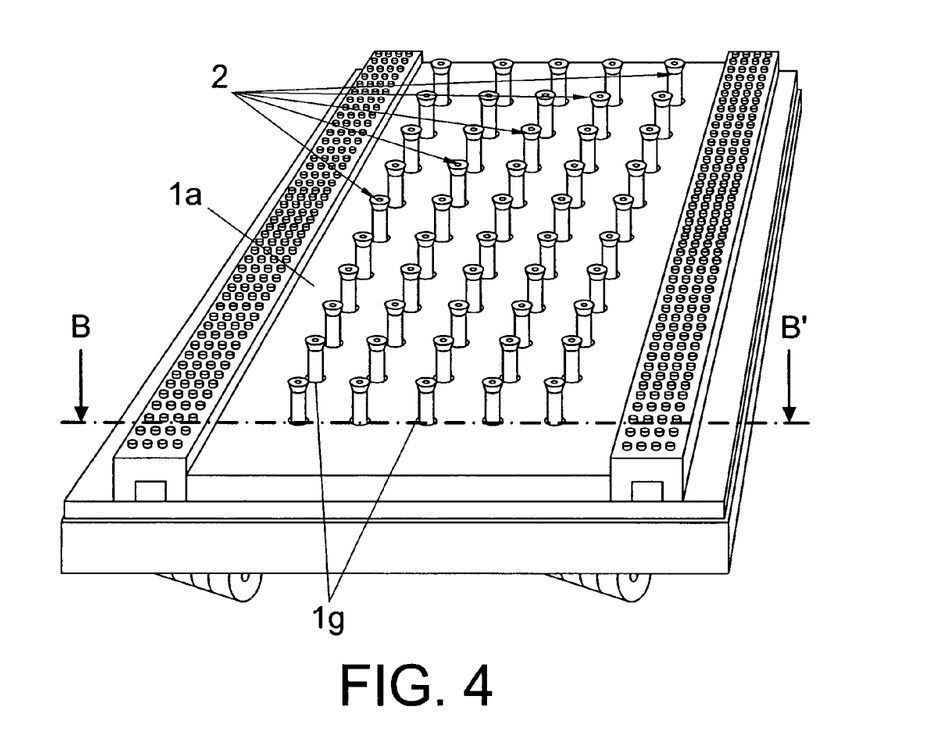
FIG. 4 is a schematic view of the platform of FIG. 1 with its telescopic actuators in the position of maximum extension.
Figure 5:
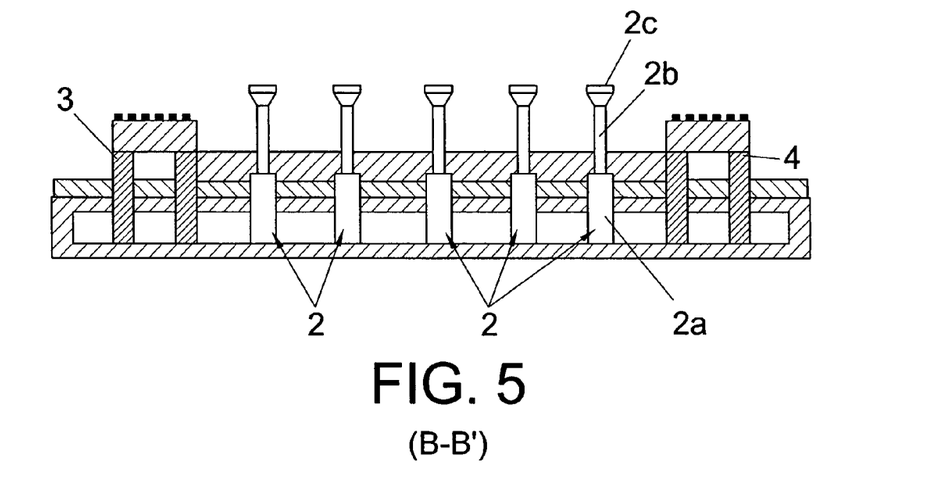
FIG. 5 is a schematic view in cross-section through the line B-B' appearing in FIG. 4.
Figures 6, 7, 8:
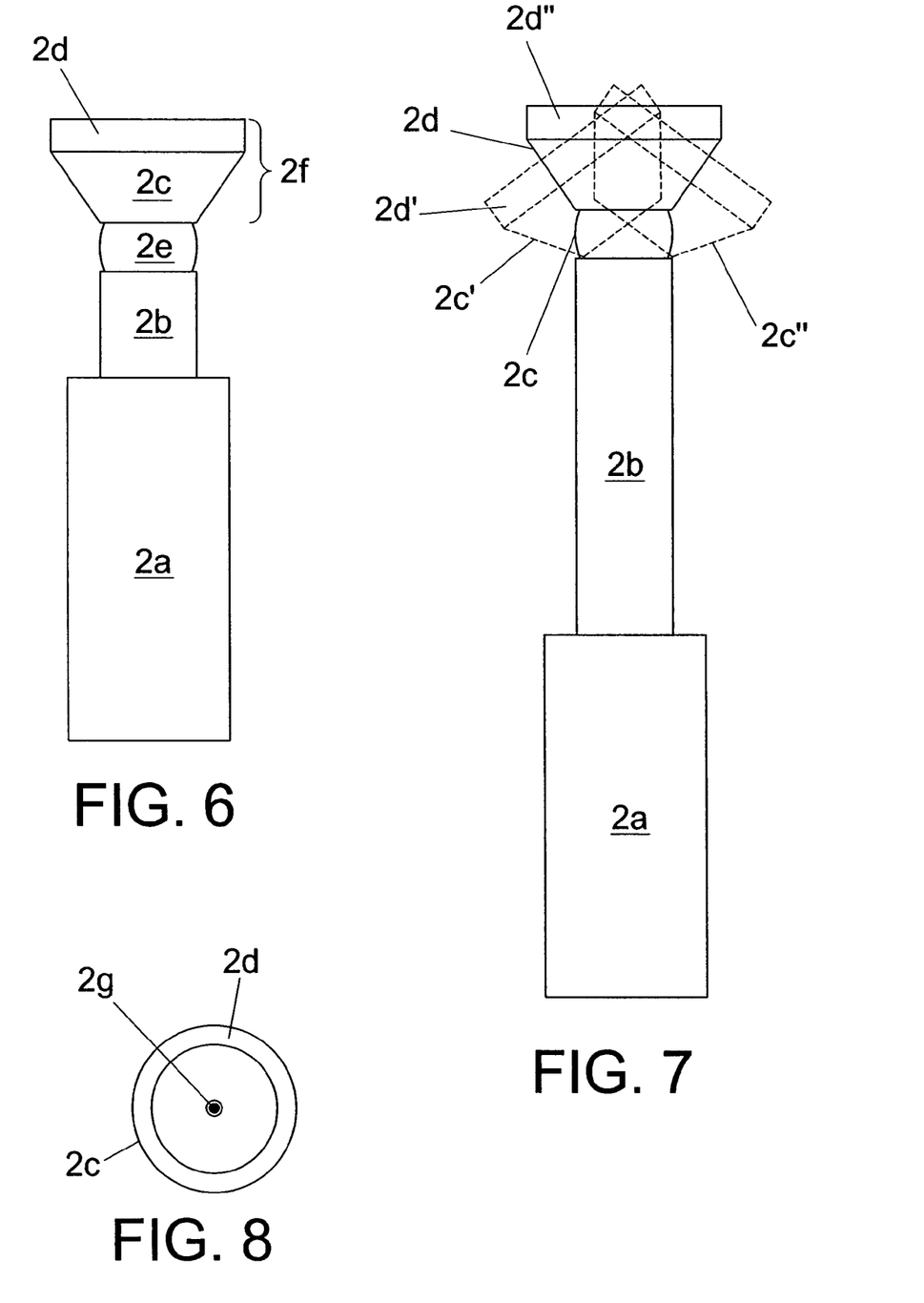
FIG. 6 is a schematic view in lateral elevation of one of the telescopic actuators in the position of maximum retraction which appear in FIGS. 1 and 2.
FIG. 7 is a schematic view in lateral elevation of one of the telescopic actuators in the position of maximum extension which appear in FIGS. 4 and 5.
FIG. 8 is a schematic view in upper plan of the telescopic actuator shown in FIGS. 6 and 7.

In accordance with what is illustrated in FIGS. 6, 7 and 8, the head 2c of each telescopic actuator is part of a suction cup 2f which contains a ring 2d in its upper mouth made of an elastically deformable material and is coupled to the shaft 2b by a swivel coupling 2e in such a way that the head 2c can swivel freely in all directions. This allows the head 2c and the ring 2d to adopt positions such as, for example, the positions 2c', 2d'-2c'', 2d''' shown in FIG. 7 which accords with the shape of the surface of the part deposited on the actuator 2. The suction cup 2f is connected to a vacuum system which will be described further below with reference to FIG. 13.

Figure 9:
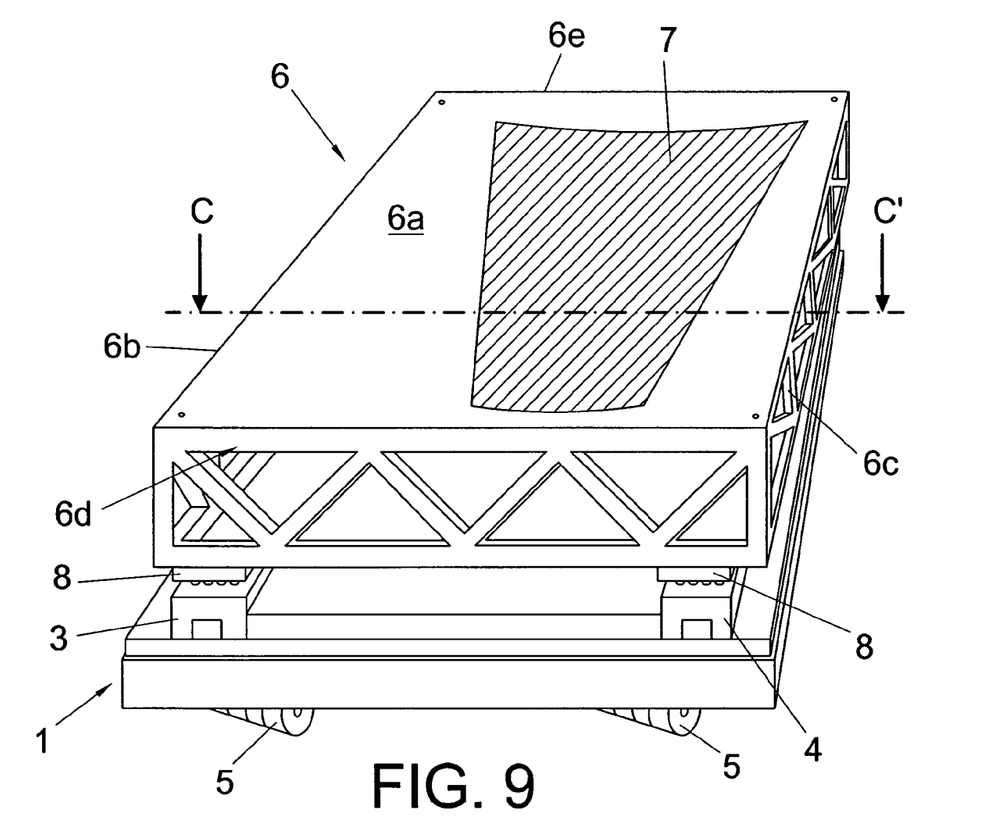
FIG. 9 is a schematic view in front perspective of the platform of FIGS. 1 to 5 on which an auxiliary trolley has been located.
Figure 10:
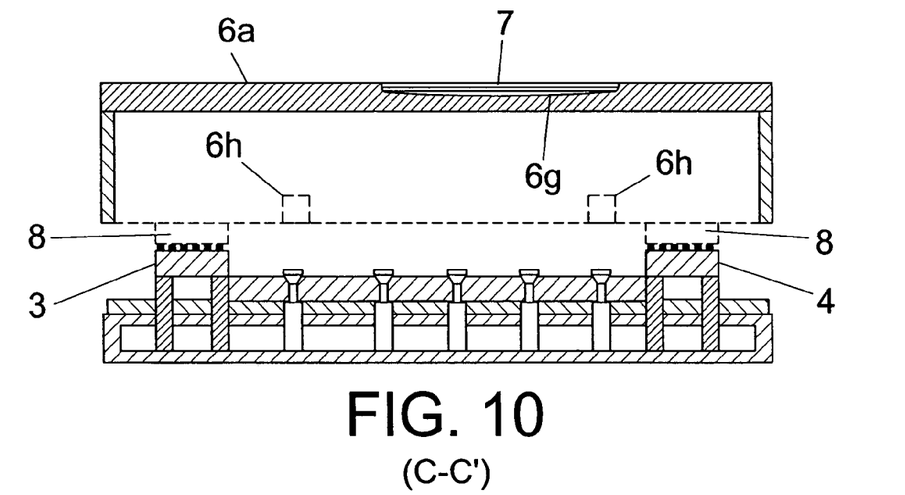
FIG. 10 is a schematic view in cross-section through the line C-C' appearing in FIG. 9.

FIGS. 9 and 10 show one of the applications of the platform of the present invention, specifically an application in which the platform carries a tool 6 in the form of a mould for the taping of a curved part 7. The tool 6 has a forward part 6d, a rear part 6e, separate lateral parts 6b, 6c and an upper surface, in addition to support elements 8 which rest on the elevated spaces 3, 4. On the upper surface 6a of the tool 6 there is a cavity 6g which has the exterior shape of the part 7. Owing to the balls 4b provided in the elevated spaces 3, 4, the tool 6 can be easily located on and withdrawn from the mobile platform. In order to immobilize the tool 6 on the mobile platform, buffers can be provided in the form of lateral and front walls (not shown in the figures), and also several of the actuators 2 can be extended in such a way that their heads 2c enter into immobilization housings 6h provided in the lower part of the tool 6.

Figure 11:
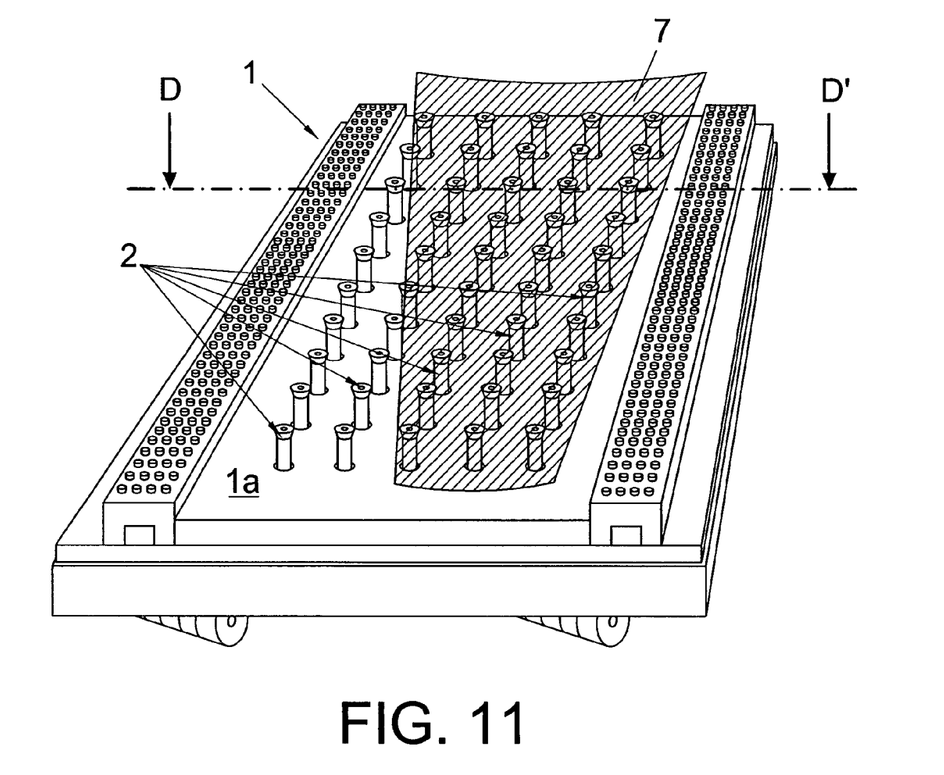
FIG. 11 is a schematic view in front perspective of the platform of FIGS. 1 to 5 with its telescopic actuators in the support position for a shaped part.
Figure 12:
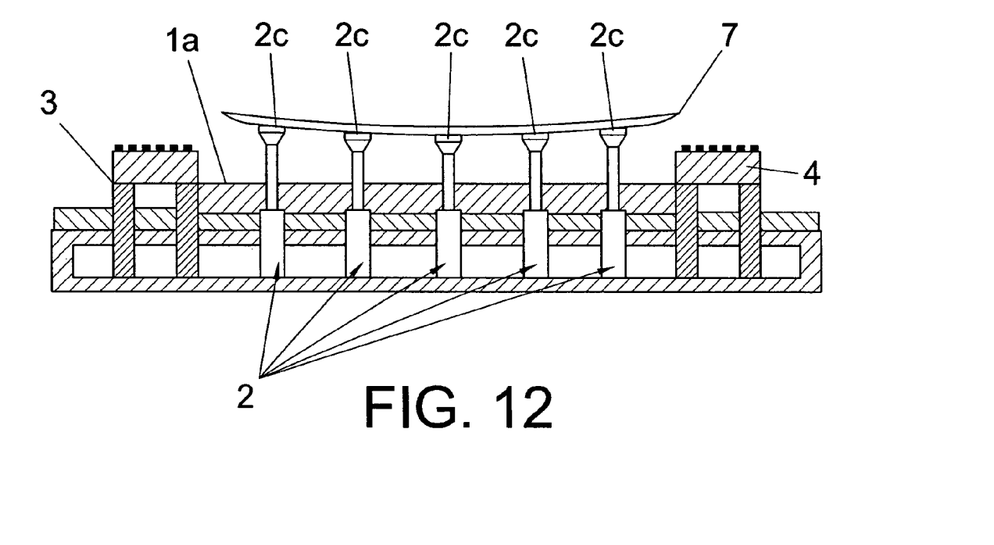
FIG. 12 is a schematic view in cross-section through the line D-D' appearing in FIG. 11.

FIGS. 11 and 12 show another application of the mobile platform of the present invention, specifically as the carrier of a cured part 7, in which the heads of the cylindrical actuators 2 shape a "bed" for part 7. This bed is shaped by adjusting the extension of each actuator 2 as far as a height which is adapted to the shape of the lower surface of the part 7 and the head 2c swivels to a position in which the ring made of an elastically deformable material makes full contact with the surface of the part such that, by applying a vacuum to the suction cup 2f, the part 7 becomes immobilized by the effect of the suction of the cups 2f of each actuator 2.

Figure 13:
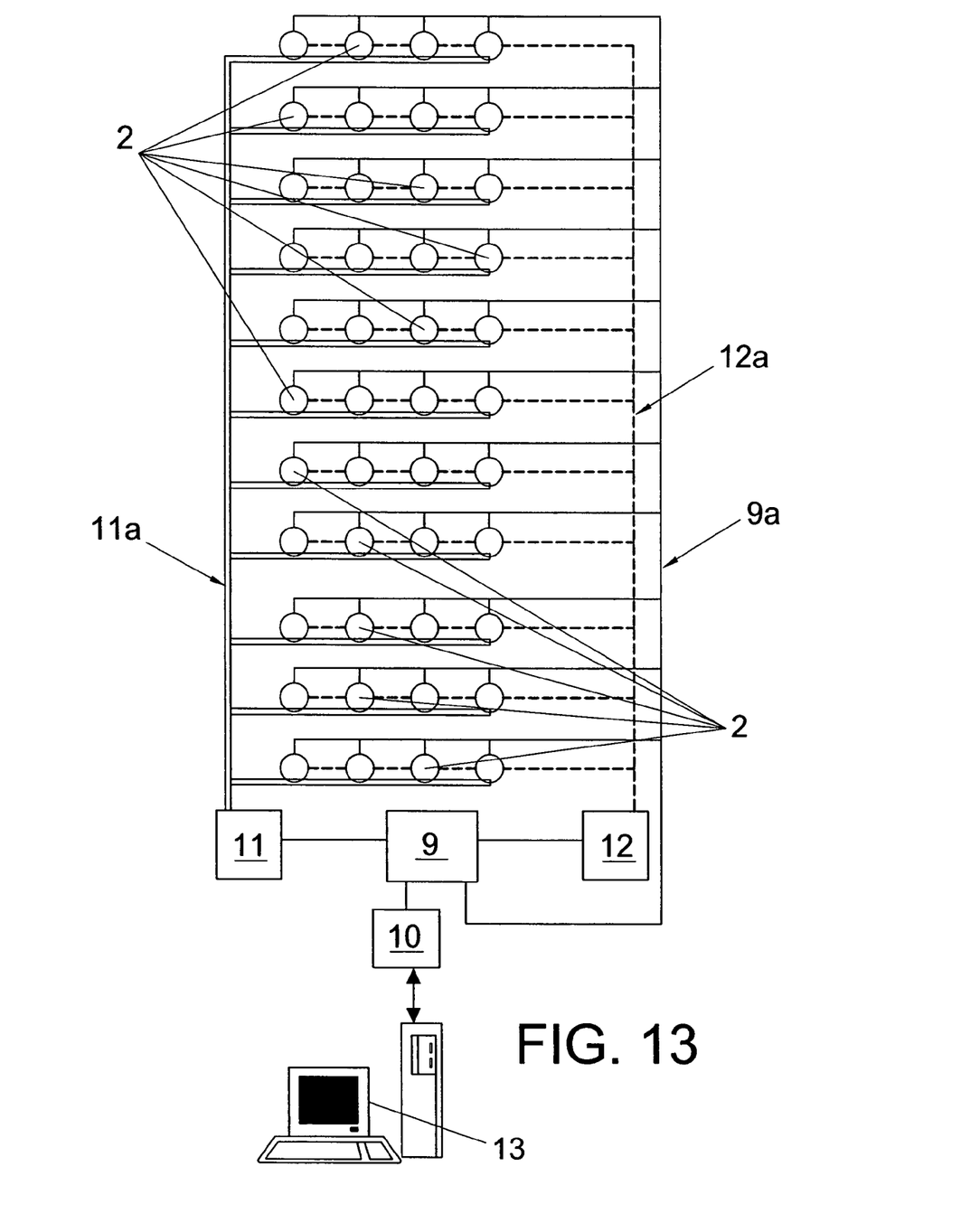
FIG. 13 schematically shows an embodiment of the electronic control system and of the pneumatic system applicable to the present invention.

The adjustment of the height and the control system for the vacuum of the telescopic actuators can be seen in FIG. 13. So, in order to be able to produce the vacuum, the suction cups 2f are individually connected to a vacuum pump 12 via vacuum lines 12a, while, in order to be able to individually adjust the height of each actuator 2, these are connected to a pressure pump 11 via some pneumatic pressure lines 11a. Each suction cup is individually connected to the vacuum line 12a via a conventional electrovalve (not shown in the figures). Similarly, each actuator 2 is individually connected to the pneumatic pressure line via another conventional electrovalve (not shown in the figures). Each of those electrovalves is in turn connected to a control unit 9 via an electrical connection line 9a. The control unit 9 opens and closes the electrovalves depending on orders received from a CPU 13 (possibly via a radio-transceiver interface 10) or depending on an internal program. This program knows how many actuators 2 it has to drive and the extension which each actuator being driven has to reach, according to the shape of the surface of the part which is going to be deposited on the heads of the actuators being driven, in order thereby to form the bed for the part, in such a way that the control unit 9 opens the electrovalve assigned to each actuator 2 in the pneumatic pressure system for a sufficient time so that each actuator can adopt the vertical extension that has been assigned to it. Likewise, once the part 7 has been deposited on the actuators 2, the control unit opens the electrovalves in the vacuum lines corresponding to those actuators whose suction cups make contact with the surface of the part 7.

The invention claimed is:

1. A supporting platform for transporting aeronautical parts, comprising:

a frame having an upper load surface for supporting the parts and wheels for moving the frame; and an array of telescopic actuators arranged in rows and columns, the telescopic actuators selected from the group consisting of pneumatic and hydraulic telescopic actuators;

wherein each telescopic actuator comprises an actuation cylinder connected to the frame, a shaft operatively connected to the actuation cylinder via one end of the shaft, and a head coupled to the other end of the shaft; the head emerging vertically from the frame through the upper surface when the telescopic actuator is actuated; and a control system connected to each telescopic actuator for individually controlling the actuation of each telescopic actuator so that each head emerges up to a selected position at a distance from the upper surface, in such a manner that all together, the surfaces of the heads form a bed surface having the shape of a surface of the part on which said part is laid without causing damage to the surface of the part.

2. A supporting platform according to claim 1, wherein the head of each telescopic actuator is coupled to the shaft via a swivel coupling.

3. A supporting platform according to claim l, wherein the head of each telescopic actuator comprises an upper part of an elastically deformable material.

4. A supporting platform according to claim 1, wherein the head of each telescopic actuator comprises a suction cup.

5. A supporting platform according to claim 1, wherein separate longitudinal elevated spaces are respectively arranged in a left part and in a right part of the frame and the separate longitudinal elevated spaces have upper surfaces that emerge above a plane of the upper surface of the frame.

6. A supporting platform according to claim 2, wherein the head of each telescopic actuator comprises an upper part of an elastically deformable material.

7. A supporting platform according to 2, wherein each head of the telescopic actuator comprises a suction cup.

8. A supporting platform according to claim 2, wherein separate longitudinal elevated spaces are respectively arranged in a left part and in a right part of the frame and the separate longitudinal elevated spaces have upper surfaces that emerge above a plane of the upper surface of the frame.

9. A supporting platform according to 3, wherein each head of the telescopic actuator comprises a suction cup.

10. A supporting platform according to claim 3, wherein separate longitudinal elevated spaces are respectively arranged in a left part and in a right part of the frame and the separate longitudinal elevated spaces have upper surfaces that emerge above a plane of the upper surface of the frame.

11. A supporting platform according to claim 4, wherein each suction cup comprises a ring in a mouth of the suction cup, the mouth being of an elastically deformable material.

12. A supporting platform according to claim 4, wherein each suction cup is connected to a pneumatic system able to produce a vacuum in each suction cup.

13. A supporting platform according to claim 4, wherein separate longitudinal elevated spaces are respectively arranged in a left part and in a right part of the frame and the separate longitudinal elevated spaces have upper surfaces that emerge above a plane of the upper surface of the frame.

14. A supporting platform according to claim 11, wherein each suction cup is connected to a pneumatic system able to produce a vacuum in each suction cup.

15. A supporting platform according to claim 11, wherein separate longitudinal elevated spaces are respectively arranged in a left part and in a right part of the frame and the separate longitudinal elevated spaces have upper surfaces that emerge above a plane of the upper surface of the frame.

16. A supporting platform according to claim 12, wherein separate longitudinal elevated spaces are respectively arranged in a left part and in a right part of the frame and the separate longitudinal elevated spaces have upper surfaces that emerge above a plane of the upper surface of the frame.

17. A supporting platform according to claim 5, wherein freely rotating elements are housed in the upper surfaces of the elevated spaces, the freely rotating elements being able to rotate in at least the axial direction of the elevated spaces.

18. A supporting platform according to claim 5, further comprising rolling rails on the upper surfaces of the elevated spaces.

19. A supporting platform according to claim 17, wherein the freely rotating elements are selected from rollers, wheels and balls.

\* \* \* \* \*